Oct. 14, 1952     S. I. VAUGHN ET AL     2,613,718
DROP STRETCH FORMING

Filed Dec. 1, 1949     2 SHEETS—SHEET 1

INVENTORS.
STANLEY I. VAUGHN
BY   ALFRED W. TUCKER

ATTORNEY.

INVENTORS.
STANLEY I. VAUGHN
BY ALFRED W. TUCKER

Richard W. Treverton
ATTORNEY.

Patented Oct. 14, 1952

2,613,718

UNITED STATES PATENT OFFICE 2,613,718

DROP STRETCH FORMING

Stanley I. Vaughn and Alfred W. Tucker, Columbus, Ohio, assignors to Curtiss-Wright Corporation, a corporation of Delaware Application December 1, 1949, Serial No. 130,564

2 Claims. (Cl. 153—2)

The present invention relates to a method and apparatus for forming sheet metal into an article of substantially channel shape.

One example of such an article is the nose skin of an airplane wing, which, in accordance with present designs intended to fly at high sub-sonic, sonic or supersonic speeds, may be formed of relatively heavy gage metal sheet or plate material, both of which are referred to herein by the term "sheet." When such material is an aluminum alloy a thickness on the order of one eighth to one quarter of an inch or more may be required. The sheet must be formed to substantially U channel shape, i. e. a channel of substantially U shape in cross-section, and the sides of the U usually must increase progressively in curvature toward the bight portion thereof which may be of a minimum radius on the order of an inch. Furthermore, the channel usually must vary in cross-section from end to end of the nose skin to correspond to spanwise taper of the entire wing.

According to the present invention such an article is made in the following manner. First, a flat sheet of metal is formed, as for example by bending on a brake, to provide it with a central portion of channel form approximating the final U channel shape and with side portions extending laterally from such central portion. The sheet thus preliminarily shaped is secured in the bed of a drop press by its side portions being clamped to work supports or pillows on the press bed which are spaced laterally to accommodate between them the central channel shaped portion of the sheet, with the interior of the channel facing upwardly. The drop die of the press, which is shaped to the desired contour of the interior surface of the completed article, is then allowed to drop by gravity into the channel to impart to the latter its final form by a stretching operation; the mass of the drop die and the height of drop being so selected that the metal of the channel is stretched beyond its elastic limit substantially throughout its thickness by impact of the die. After this forming operation the sheet is removed from the press, and the side portions which constitute excess material are trimmed off.

It has been found that this process provides a finished article whose contour accurately follows that of the drop die. The springback usually encountered in parts which are stretch formed by means of the conventional hydraulic stretch press is observed to be lessened. In fact articles produced according to the present invention have exhibited a slight negative springback, the channel after being formed and removed from the press tending to close slightly rather than to open. Other advantages are that the expense of a female die is entirely eliminated; the fibres of the metal of the channel are stretched uniformly from side to side of the sheet so that thickness remains uniform throughout the formation and a minimum of overall elongation of the sheet is necessary for forming; and the metal is toughened by the drop stretch operation which, as to this effect, appears to be similar to a forging operation. Moreover, since a drop press capable of applying the energy necessary to form an article of given size and shape is inherently lighter and less expensive than a press closed by power means, the invention makes possible the production of articles which would not be economically feasible with other types of presses. Still another advantage resides in more accurate control, since the height of drop, and hence the energy applied, can be accurately controlled, whereas with a hydraulic stretch press the amount of stretch usually must depend upon the judgment of the press operator.

In cases where an airplane wing nose skin or other article of generally similar form is to be made of a metal alloy capable of being hardened by heating to a certain temperature, quenching and then aging, such as is the case with certain well-known aluminum alloys, the invention contemplates that such heating be done after the preliminary forming of the sheet and that the final forming on the drop press be accomplished before aging occurs, while the metal is still in an unhardened state. This provides the advantage of removing strains introduced in the preliminary forming operation, since the temperature employed for hardening is substantially above that employed for annealing. There is the further advantage that distortions resulting from the heating and quenching operations are eliminated, no further heat treatment being required subsequent to the drop stretch forming.

The foregoing and other objectives and advantages of the invention will appear from the following detailed description made in conjunction with the accompanying drawings, wherein.

Figure 1:
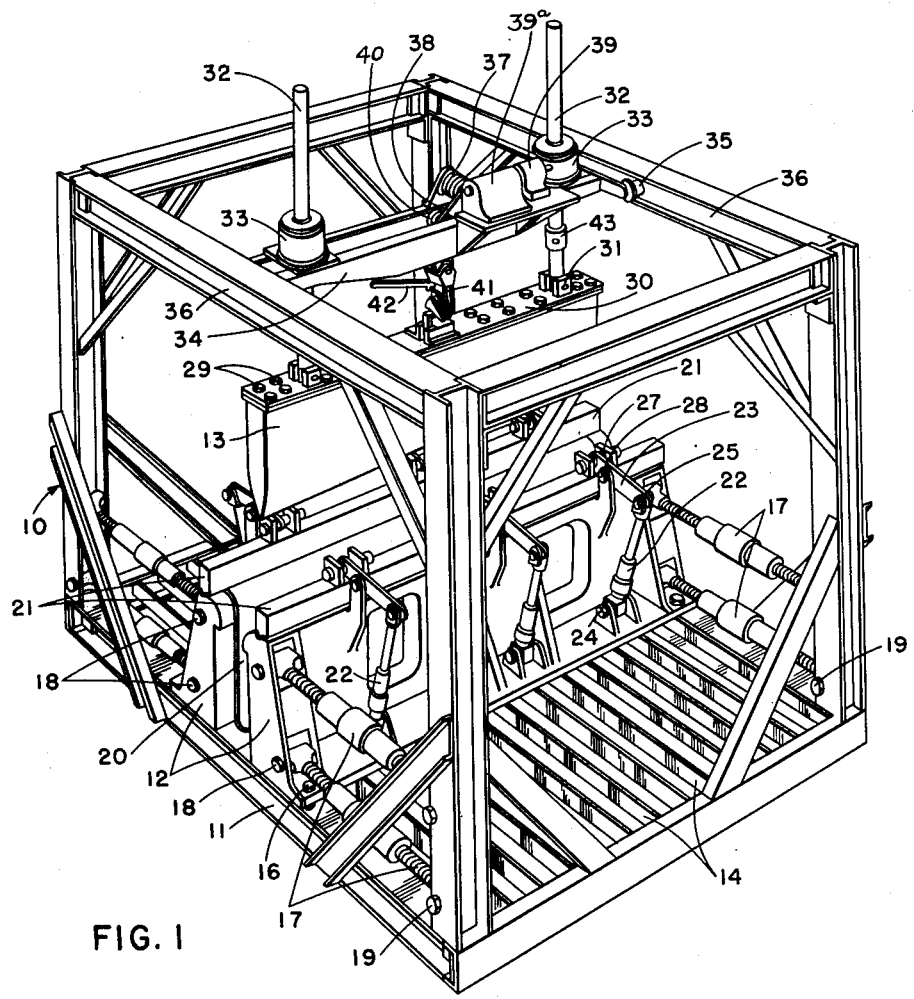
Fig. 1 is a perspective view of the drop stretch press with the drop die in elevated position and a preliminarily formed sheet clamped in the press bed.
Figure 2:
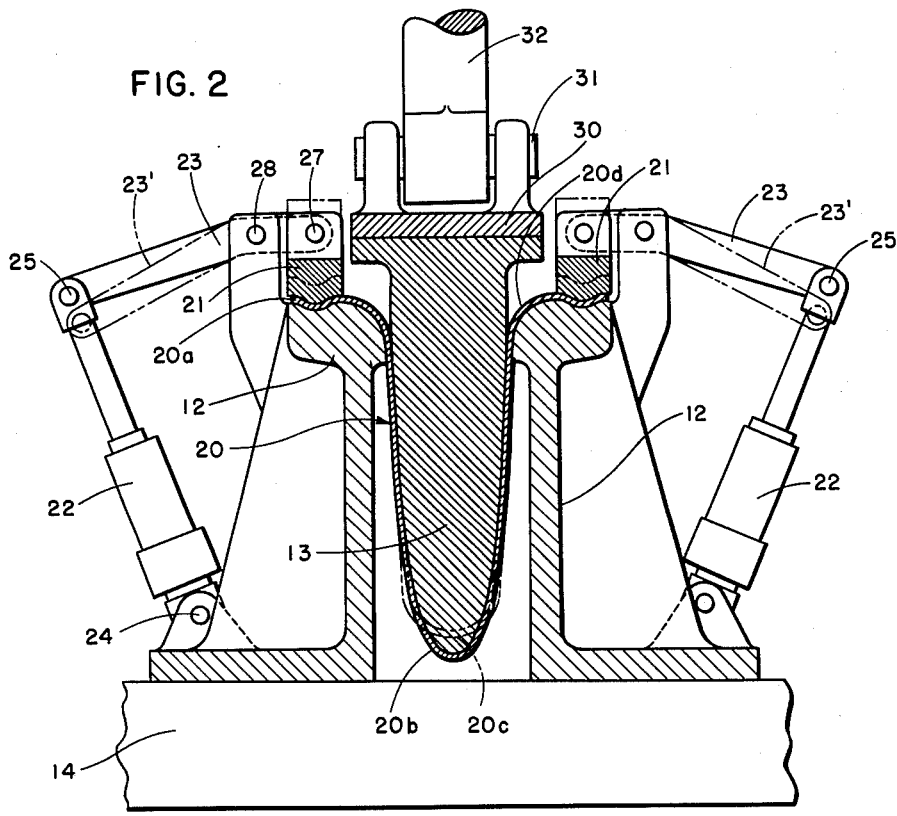
Fig. 2 is a fragmentary vertical sectional view showing the die in its dropped position, with a formed sheet in the press, and, Fig. 3 is a broken perspective view of the formed sheet prior to the trimming operation.

The press shown in Figs. 1 and 2 includes a frame 10 having a bed 11 made up of a plurality of parallel bars 14 to which are attached work supporting pillows 12, and a drop die 13 arranged to move vertically in a guide structure provided on the frame. The pillows 12 are clamped to bars 14 by bolts 16 and are braced by turnbuckles 17 which are connected to them by bolts 18 and to the frame by bolts 19. By loosening the clamp bolts 16 and adjusting the turnbuckles the pillows may be adjusted along the bars of the bed to accommodate drop dies of various thicknesses.

The metal sheet to be formed, designated at 20 in Fig. 1, has its side edge portions 20a supported on the top surfaces of the pillows 12, and its central portion 20b depending in the form of an upwardly facing channel into the space between the pillows. The edge portions 20a are clamped to the pillows by clamp bars 21 which are actuated by hydraulic jacks 22 through the agency of levers 23. The lower ends of the jacks are pivoted at 24 to the pillows while their upper ends are pivoted at 25 to the levers. The latter are pivoted to the clamp bars by pins 27 and are fulcrumed to the pillows by pins 28. As best shown in Fig. 2 the clamping faces of the pillows 20 and bars 21 are undulated in complementary fashion in order to firmly grip the sheet edges 20a when the jacks are extended, this being accomplished by the application to the jacks of hydraulic pressure through a suitable hydraulic system, not shown. By reversed application of hydraulic pressure the jacks may be shortened to tilt the levers 23 to the broken line position thereof indicated at 23' in Fig. 2, to thereby elevate the clamp bars.

The drop die 13 is formed to the contour desired for the inner surface of the channel shaped article to be formed on the press. It is bolted or otherwise detachably secured as indicated at 29 to a backing bar 30 that is pivotally connected by pins 31 to vertical guides 32. The latter are arranged to slide in vertical guide ways 33 mounted on a travelling beam 34 supported by rollers 35 resting on the lower flanges of beams 36 of the frame 10. The travelling beam 34 which may be moved to any desired position along the beams 36, also supports a drum 37 for the hoisting cable 38 for the drop die, and a motor 39 and gear box 39a which serve to drive the drum. As shown in Fig. 1 the cable 38 passes over a sheave 40 and is connected to the die backing bar 30 by a releasable hook mechanism 41 having a release handle 42. By operation of the handle the die may be detached from the cable and thus allowed to drop by gravity free of the hoisting mechanism. Adjustable stops 43 on the guides 32 are engageable with the bottom faces of ways 33 and may be set at any desired height along the guides to limit the height from which the die is dropped.

Figure 3:
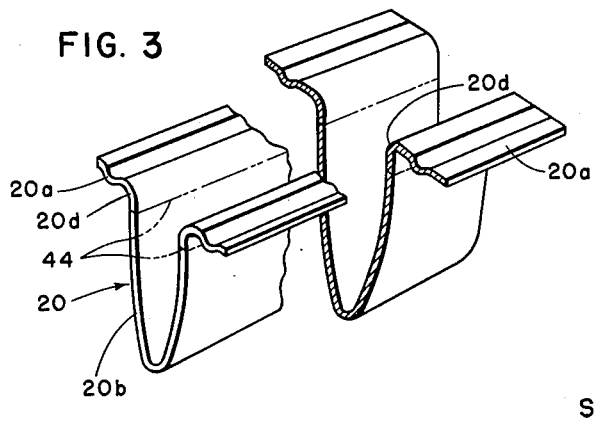

In carrying out the process of the present invention a flat sheet is first formed, as for example by being bent on a power brake to form bends indicated at 20c and 20d so that the central portion of the sheet is of a U channel shape which at least roughly resembles the desired shape of the completed article and so that the sheet may be slid endwise into the press to the position thereof indicated in Fig. 1 and in broken lines in Fig. 2 while the clamping bars 21 are held in their raised positions by the hydraulic jacks 22. After such entry of the sheet into the press the jacks are operated to press down the clamping bars 21 whose lower surfaces cooperate with the upper surfaces of pillows 12 to slightly deform and thereby firmly grip the sheet edge portions 20a. The die 13 then is preferably dropped preliminarily once or several times, from a height much less than is necessary to finally form the sheet, in order to bend the channel 20b more closely to the contour of the die. Then the die is raised to the limit position determined by stops 43 and again dropped, this action resulting in instantaneous stretching of the metal sheet along its entire width between the clamped parts 20a and causing the part so stretched to conform accurately to the contour of the die. The formed article is then released by hoisting the die and operating the jacks 22 to raise clamp bars 21, and is then removed endwise from the press. It is then in the form illustrated in Fig. 3 and is cut along the broken lines indicated at 44 to remove the excess material 20a and 20d.

With the process described it has been observed that uniform elongation occurs throughout the metal of the sheet, the product being improved in this respect over articles formed on a hydraulic stretch press. One possible explanation for this improvement may be that when stretching motion is applied relatively slowly, as in an hydraulic stretch press, load sufficient to overcome the elastic limit is applied successively first to one and then to another part of the sheet being formed because the load applied to each part of the sheet depends, at least partially, upon the friction and other restraint to free sliding motion between such part and the surface of the die adjacent to it, such restraint being different at different points along the contour of the die. This may result in load sufficient to exceed the elastic limit being applied for a longer time to certain parts of the sheet than to others, with the result that unequal elongation occurs; whereas with the press and process of the present invention a load much greater than necessary to overcome the restraint at any point along the contour of the die, and sufficient to exceed the elastic limit, is applied almost instantaneously to all parts of the sheet being formed, with the result that the duration of the stretching action is substantially constant throughout the sheet.

The preliminary dropping of the die from a low height prior to the final forming drop is desirable especially when the preliminary bending of the sheet, prior to its entry into the press, has not brought it into relatively close approximation of the final form. However such preliminary dropping is not essential to the practice of the invention. In this connection it will be noted that because of the pivots 31 the die may pivot as it drops into contact with the channel so as to act uniformly from end to end of the channel. If greater impact is necessary at one end of the sheet than at the other, as for example if the channel is to be tapering in cross-section, the die may be made heavier at one end than the other.

The amount of stretch necessary to good forming will of course depend upon the severity of the contour, and on the thickness and composition of the sheet. With 24S and 75S aluminum alloy sheets of 0.091 inch thickness, a stretch of one and one half percent of the unsupported width of the sheets between the clamp bars (a width of about sixty inches) was found to be sufficient to form a contour substantially like that shown in the drawings. The height of drop necessary to stretch to the necessary extent may be calculated approximately from the formula:

$$H = \frac{AS}{W}\left(\frac{Ts}{2} + Tl\right)$$

where H is the drop in inches, A is the area of the sheet in a plane transverse to the direction of stretch, S is the yield stress of the metal in pounds per square inch, $Ts$ is the total strain in inches at the yield point, $Tl$ is the total stretch of the sheet between the clamp bars and W is the weight of the drop die in pounds. Applying the formula to forming with a 5000 pound drop die assembly, a sheet that is sixty inches in width between the clamped edge portions thereof and seventy-two inches in length along the channel, a thickness of 0.091 inch, yield stress of 25,000 pounds per square inch in the condition of aging in which forming is done, and a strain per inch at the yield point of 0.0025 inch, the following is indicated:

$$A = 72 \times 0.091 = 6.55 \text{ square inches}$$
$$Ts = 60 \times 0.0025 = 0.15 \text{ inch}$$
$$Tl = (1\tfrac{1}{2}\% \text{ of } 60) - Ts = 0.90 - 0.15 = 0.75 \text{ inch}$$
$$H = \frac{6.55 \times 25{,}000}{5{,}000}\left(\frac{0.15}{2} + 0.75\right)$$
$$= 32.75 \times 0.825 = 27 \text{ inches, approximately}$$

Once the height of drop necessary to achieve good forming has been determined either by calculation or experimentally, or by a combination of the two, and the stops 43 have been set to this height, articles of the same kind can thereafter be produced in any desired quantity without further exercise of judgment on the part of the press operator.

In case the metal of the sheet is of a type capable of being hardened by heating, quenching and aging, such as the aluminum alloys known as 24S and 75S, it is preferably heated to the solution heat treatment temperature, and then quenched, between the preliminary forming operation and entry into the press, and preferably as little time as possible is allowed to elapse between the quench and the final forming operation in order that aging will not advance appreciably prior to final forming. When using the 24S material the sheet is heated to a temperature of 920 degrees Fahrenheit for a period of about twenty minutes to one hour, depending upon the thickness of the sheet, is then quenched to room temperature, and is preferably formed within thirty minutes thereafter, since with this material the precipitation heat treatment at room temperature, or natural aging process, progresses rapidly during the period between thirty minutes and one hour after quenching. With other alloys more or less latitude may be allowed between quenching and forming. For example with the aluminum alloy 75S, which is solution heat treated by heating to 870° F. and then quenching to room temperature, aging proceeds very slowly during the first forty-five minutes following the quench.

It will be understood that the disclosure herein has been made by way of illustration of the principles involved, and not by way of limitation, for both the process and apparatus may be modified in various ways which will be obvious to those skilled in the related arts, and there is no intention to limit the scope of the invention otherwise than by the definition thereof set forth in the appended claims.

We claim:

1. The method of forming an article of U channel shape from a sheet of metal, comprising preforming the sheet to provide a central portion in the form of a channel approximating said U channel shape and extending from end to end of the sheet, and to provide side portions extending laterally from said central portion; supporting and gripping the sheet at only said side portions thereof and with the interior of said channel facing upwardly; then, with the sheet so supported and gripped, dropping a male die by gravity into the channel from a height sufficient to act by impact to permanently stretch the metal of said central portion substantially throughout the thickness of the sheet; and then trimming off said side portions.

2. The method of forming an article of U channel form from a sheet of metal, comprising supporting and gripping the sheet at only the side portions thereof, with the central portions of the sheet depending downwardly to form a channel which extends from end to end of the sheet and whose interior faces upwardly, and then, with the sheet so supported and gripped, dropping a male die by gravity into the channel from a height sufficient to act by impact to permanently stretch the metal of said central portion of the sheet.

STANLEY I. VAUGHN.
ALFRED W. TUCKER.

REFERENCES CITED

The following references are of record in the file of this patent:

UNITED STATES PATENTS

| Number | Name | Date |
|---|---|---|
| 1,622,590 | Jolstad | Mar. 29, 1927 |
| 1,710,262 | Kellogg | Apr. 23, 1929 |
| 2,220,036 | Fitzgerald | Oct. 29, 1940 |
| 2,302,953 | Pocock | Nov. 24, 1942 |
| 2,378,413 | Lermont | June 19, 1945 |
| 2,485,354 | Brennan | Oct. 18, 1949 |

FOREIGN PATENTS

| Number | Country | Date |
|---|---|---|
| 543,040 | Great Britain | Feb. 6, 1942 |

OTHER REFERENCES

Pp. 149 through 158 of September 1943 Issue of Machinery.

Pp. 114 through 117 of November 22, 1945 Issue of Machinist.